United States Patent
Smegal

(10) Patent No.: US 8,921,254 B2
(45) Date of Patent: Dec. 30, 2014

(54) HYDROPROCESSING CATALYST AND METHODS OF MAKING AND USING SUCH A CATALYST

(75) Inventor: John Anthony Smegal, Houston, TX (US)

(73) Assignee: Shell Oil Company, Houston, TX (US)

(*) Notice: Subject to any disclaimer, the term of this patent is extended or adjusted under 35 U.S.C. 154(b) by 178 days.

(21) Appl. No.: 13/528,410

(22) Filed: Jun. 20, 2012

(65) Prior Publication Data

US 2012/0330082 A1 Dec. 27, 2012

Related U.S. Application Data

(60) Provisional application No. 61/499,918, filed on Jun. 22, 2011.

(51) Int. Cl.

| | | |
|---|---|---|
| *B01J 27/185* | (2006.01) | |
| *B01J 27/188* | (2006.01) | |
| *C10G 45/04* | (2006.01) | |
| *C10G 47/12* | (2006.01) | |
| *C10G 49/02* | (2006.01) | |
| *B01J 37/02* | (2006.01) | |
| *B01J 37/20* | (2006.01) | |
| *B01J 21/04* | (2006.01) | |
| *B01J 27/19* | (2006.01) | |
| *B01J 35/10* | (2006.01) | |

(52) U.S. Cl.
CPC ............... *C10G 45/04* (2013.01); *C10G 47/12* (2013.01); *C10G 49/02* (2013.01); *B01J 37/024* (2013.01); *B01J 37/20* (2013.01); *B01J 21/04* (2013.01); *B01J 27/19* (2013.01); *B01J 35/1014* (2013.01); *B01J 35/1019* (2013.01); *B01J 35/1042* (2013.01); *B01J 35/1047* (2013.01); *B01J 35/1061* (2013.01); *B01J 35/1066* (2013.01); *B01J 37/0201* (2013.01); *B01J 37/0205* (2013.01)
USPC .......................................... 502/213; 502/210

(58) Field of Classification Search
USPC .................................................. 502/210, 213
See application file for complete search history.

(56) References Cited

U.S. PATENT DOCUMENTS

| | | | |
|---|---|---|---|
| 4,600,703 A | 7/1986 | Morales et al. | |
| 4,642,179 A | 2/1987 | Morales et al. | |
| 5,336,654 A | 8/1994 | Aldridge et al. | |
| 5,338,717 A | 8/1994 | Aldridge et al. | |
| 6,218,333 B1 | 4/2001 | Gabrielov et al. | |
| 7,618,916 B2 * | 11/2009 | Fujikawa et al. | ............. 502/208 |
| 8,431,018 B2 * | 4/2013 | Maity et al. | ............. 208/216 PP |
| 2008/0017551 A1 * | 1/2008 | Kiriyama et al. | ............. 208/134 |
| 2009/0298677 A1 | 12/2009 | Radlowski et al. | |

OTHER PUBLICATIONS

PCT International Search Report, Application No. PCT/EP2012/043247 dated Oct. 16, 2012.

* cited by examiner

*Primary Examiner* — Patricia L Hailey
(74) *Attorney, Agent, or Firm* — Charles W. Stewart

(57) ABSTRACT

A method of preparing a hydroprocessing catalyst that may have a high metals loading and has a particularly high activity for hydrodenitrogenation. The method uses several metal impregnations in combination with different intermediate treatment steps so as to provide a catalyst composition that includes a mix of different types of catalytically active sites. The method of the invention allows for the optimization and control of the relative ratio of the different types of active catalyst sites on the catalyst composition in order to give certain desired results and improved catalytic performance. The catalyst composition comprises a one or more active metals or active metal precursors that are incorporated onto a support material.

28 Claims, 1 Drawing Sheet

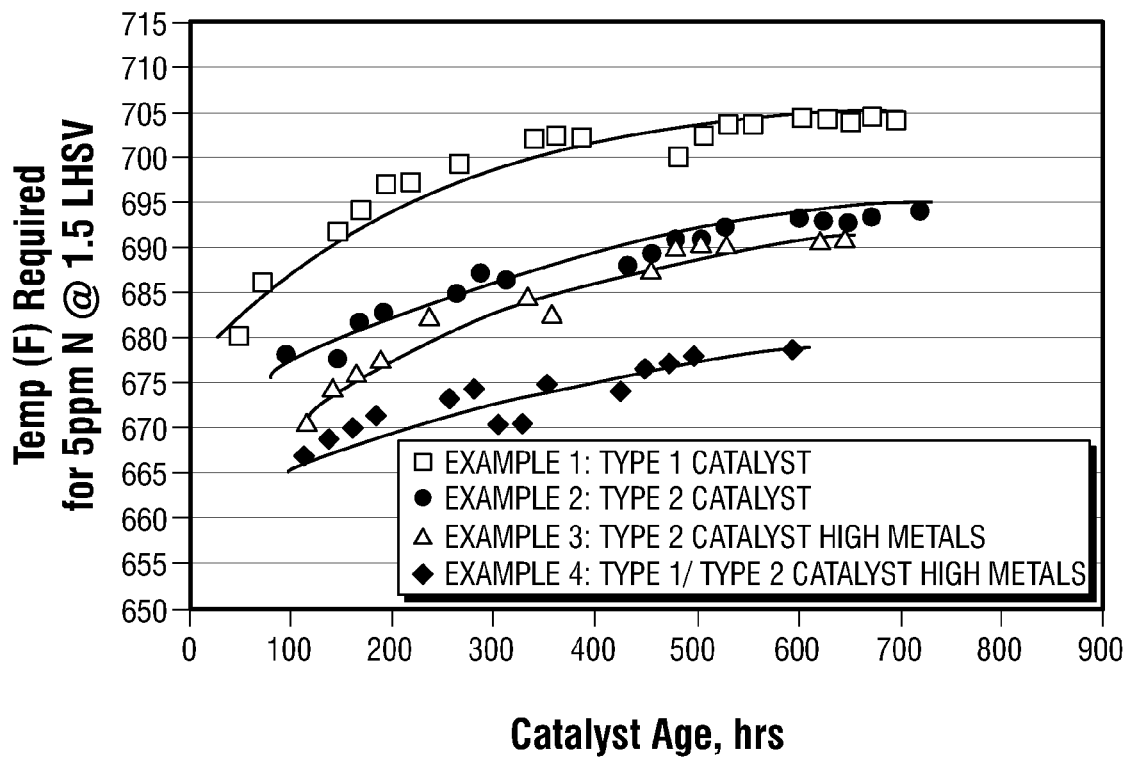

HYDROPROCESSING CATALYST AND METHODS OF MAKING AND USING SUCH A CATALYST

This application claims the benefit of U.S. Provisional Application No. 61/499,918 filed Jun. 22, 2011, the entire disclosure of which is hereby incorporated by reference.

This invention relates to a high activity hydroprocessing catalyst having a high metals loading prepared by a method that includes multiple metals incorporation steps.

BACKGROUND OF THE INVENTION

In the catalytic hydroprocessing of hydrocarbon feedstocks particulate catalysts are used to promote such reactions as desulfurization, denitrogenation, demetallization, and cracking. This is done by contacting the particulate catalyst with hydrocarbon feedstocks such as gas oils, distillates (e.g., diesel and kerosene), naphthas and gasolines under conditions of elevated temperature and pressure and in the presence of hydrogen. With hydrodesulfurization, the organic sulfur components of the hydrocarbon feedstock are converted to hydrogen sulfide, and, with hydrodenitrogenation, the organic nitrogen components of the hydrocarbon feedstock are converted to ammonia.

A typical hydroprocessing catalyst contains one or more hydrogenation metal and, optionally, one or more promoter, that are supported on a porous refractory oxide support. The hydrogenation metal is typically a Group VIB metal or a Group VIII metal, or a combination of both such metals, that is used as an active component supported on a porous refractory oxide, such as, alumina. A promoter, such as phosphorous, may also be incorporated into the porous refractory oxide. These hydroprocessing catalysts are typically prepared by impregnation of the active components into the support by contacting it with an aqueous solution containing the active components in dissolved form. The impregnated support is then usually dried and calcined to convert the active metals and promoters to the oxide form. The catalyst is then activated, usually by sulfiding, to prepare it for use.

One method of preparing supported hydroprocessing catalysts is disclosed in U.S. Pat. No. 5,336,654. This patent teaches a method for the preparation of hydrotreating catalyst by impregnating an inorganic oxide material with a Group VIII metal salt of an acid and a Group VI heteropolyacid. The metals can be incorporated into the support by using one or more impregnations. After the impregnation of the support, the catalyst is dried to remove free water from the catalyst and then heat treated to a temperature of up to about 300° C. The impregnated support is then sulfided.

U.S. Pat. No. 5,338,717 discloses various methods of preparing a supported hydroprocessing catalyst. In one of the disclosed methods, several impregnation steps are used to prepare a catalyst. In this method, a support is first impregnated with a Group VI heteropolyacid followed by treating the impregnated support with an aqueous solution of a reducing agent. The impregnated treated support is further impregnated with a Group VIII metal salt of an acid followed by drying at a temperature of from about 20° C. to 200° C. and then sulfiding to form the final catalyst. In another of the disclosed methods, the support is first impregnated with both the Group VIII metal salt and the Group VI heteropolyacid, followed by drying at a temperature of from about 20° C. to 200° C. the impregnated dried support is then treated with a reducing agent, again dried, and sulfided to form the final catalyst.

Disclosed in U.S. Pat. No. 6,218,333 is a method of preparing a hydroprocessing catalyst by combining a porous support with an active metal so as to form a catalyst precursor having a volatile content. The volatiles are driven from the catalyst precursor under non-calcination temperature conditions while treating the catalyst precursor with a sulfur containing compound.

SUMMARY OF THE INVENTION

It is an important and continuing aim in the refining catalyst art to develop new, high performance hydroprocessing catalysts that are useful in providing high quality hydrocarbon products and in improving refinery economics. It is a further goal to develop novel methods of making such high performance catalysts.

Accordingly, provided is a method of preparing a catalyst composition useful in the hydroprocessing of hydrocarbon feedstocks, wherein said method comprises: providing a support particle; impregnating said support particle with a first aqueous impregnation solution comprising a first Group VIII metal component, a first Group VIB metal component and a first phosphorous component to thereby provide a metals impregnated support; calcining said metals impregnated support to provide a base catalyst comprising Type I active sites and said first phosphorous component; impregnating said base catalyst with a second aqueous impregnation solution comprising a second Group VIII component, a second Group VIB component and a second phosphorous component to thereby provide a metals impregnated base catalyst; drying said metals impregnated base catalyst under non-calcination conditions that are controlled so as to provide a dried intermediate comprising Type II active sites and said second phosphorous component; and sulfiding said dried intermediate, without a prior calcination thereof, to thereby provide said catalyst composition.

Also provided is a catalyst composition useful in the hydroprocessing of hydrocarbon feedstocks, wherein said catalyst composition comprises: a metals impregnated support comprising a support particle having incorporated therein a first Group VIII metal, a first Group VIB metal and a first phosphorous component and having been calcined, and, which thereafter has been impregnated with a second aqueous solution of a second Group VIII component, a second Group VIB component and a second phosphorous component and dried, but not calcined, to thereby provide a dried intermediate having a volatiles content in the range of from 3 to 20 wt. % LOI. The process of the invention comprises contacting under hydrodesulfurization process conditions a hydrocarbon feedstock with the dried intermediate or a derivative thereof.

BRIEF DESCRIPTION OF THE DRAWING

FIG. 1 are plots of the results of the activity testing of an inventive catalyst and three comparative catalysts.

DETAILED DESCRIPTION OF THE INVENTION

The inventive method provides for the preparation of a hydroprocessing catalyst that has a high metals loading and a particularly high activity for hydrodenitrogenation. It is believed that the inventive catalyst composition prepared by this novel method has its particularly good catalytic properties due, in part, to the manner by which it is prepared. The inventive method uses several metal impregnations in combination with different intermediate treatment steps so as to provide a catalyst composition that includes a mix of different types of catalytically active sites. This mixture of different types of active sites in the catalyst composition is thought to provide certain synergistic benefits that result in the catalyst composition having the observed good catalytic properties. The method of the invention allows for the optimization and control of the relative ratio of the different types of active catalyst sites on the catalyst composition in order to give certain desired results.

The catalyst composition of the invention comprises a high loading level of one or more active metals or active metal precursors that are incorporated onto a support material. The active metal or metals are, in general, incorporated into the support material by any standard solution impregnation method known to those skilled in the art for incorporating active metal or metals into or onto a support material. Multiple impregnations are used in combination with further heat treatments each of which is performed under a specifically controlled temperature condition so that both Type I and Type II catalytically active metal sites are provided in the final catalyst composition. The meaning of the terms Type I active site and Type II active site are more fully described below. The amount of active metal or active metal precursor incorporated onto the support material during the impregnations is controlled so as to, in combination with the heat treatments, provide the desired ratio of Type II to Type I active sites in the final catalyst composition.

The catalyst composition of the invention thus includes a support material that has incorporated therein or is loaded with: (a) either one or more first Group VIII metal components or one or more first Group VI metal components, or a combination of both a first Group VIII metal component and a first Group VI metal component, that provide for Type I active sites on the catalyst composition; and (b) either one or more second Group VIII metal components or one or more second Group VI metal components, or a combination of both a second Group VIII metal component and a second Group VI metal component, that provide for Type II active sites on the catalyst composition.

The ratio of the weight of the second Group VIII metal plus second Group VI metal (Type II) to the weight of the first Group VIII metal plus first Group VI metal (Type I), i.e., ratio of Type II/Type I, that is contained in the catalyst composition is controlled so as to provide a catalyst composition with certain desirable properties. A preferred catalyst composition comprises a support material loaded with metals such that there is a mixture of Type I and Type II active catalyst sites in the catalyst composition in a desired ratio and with the catalyst composition further being in a sulfided form.

The active metal component of the catalyst composition is a metal or metal compound that is or can be converted to a metal compound having activity towards the catalytic hydrogenation of organic nitrogen compounds, or organic sulfur compounds or, otherwise has application in the hydrodenitrogenation or hydrodesulfurization or hydroprocessing of hydrocarbon feedstocks.

The support material of the inventive composition can comprise any suitable inorganic oxide material that is typically used to carry catalytically active metal components. Examples of possible useful inorganic oxide materials include alumina, silica, silica-alumina, magnesia, zirconia, boria, titania and mixtures of any two or more of such inorganic oxides. The preferred inorganic oxides for use in the formation of the support material are alumina, silica, silica-alumina and mixtures thereof. Most preferred, however, is alumina.

It is preferred for the support material to be formed into a shaped support particle comprising an inorganic oxide material. The support particle is thereafter loaded in accordance with the inventive method with the active metals or active metal precursors, preferably, by multiple (i.e., two or more) impregnations of the shaped particle with the aqueous solutions of the invention which each comprises either one or more Group VIII metal components or one or more Group VI metal components, or a combination of both a Group VIII metal component and a Group VI metal component, and, optionally, a phosphorous component.

To form the shaped particle, the inorganic oxide material, which preferably is in a powder form, is mixed with water and, if desired or needed, a peptizing agent and/or a binder to form a mixture that can be agglomerated particles or shaped into an agglomerate or a shaped particle.

It is desirable for the mixture to be in the form of an extrudable paste suitable for extrusion into extrudate particles, which may be of various shapes such as cylinders, trilobes, etc. and nominal sizes such as 1/16", 1/8", 3/16", etc. The support material of the inventive composition, thus, preferably, is a shaped or support particle comprising an inorganic oxide material.

The shaped particle is then dried under standard drying conditions that can include a drying temperature in the range of from 50° C. to 200° C., preferably, from 75° C. to 175° C., and, most preferably, from 90° C. to 150° C. After drying, the shaped particle is calcined under standard calcination conditions that can include a calcination temperature in the range of from 250° C. to 900° C., preferably, from 300° C. to 800° C., and, most preferably, from 350° C. to 600° C., to provide a calcined shaped particle.

The calcined shaped particle can have a surface area (determined by the BET method employing $N_2$, ASTM test method D 3037) that is in the range of from 50 $m^2/g$ to 450 $m^2/g$, preferably from 75 $m^2/g$ to 400 $m^2/g$, and, most preferably, from 100 $m^2/g$ to 350 $m^2/g$.

The mean pore diameter in angstroms (Å) of the calcined shaped particle is in the range of from 50 to 200, preferably, from 70 to 150, and, most preferably, from 75 to 125.

The pore volume of the calcined shaped particle is in the range of from 0.5 cc/g to 1.1 cc/g, preferably, from 0.6 cc/g to 1.0 cc/g, and, most preferably, from 0.7 to 0.9 cc/g.

Less than ten percent (10%) of the total pore volume of the calcined shaped particle is contained in the pores having a pore diameter greater than 350 Å, preferably, less than 7.5% of the total pore volume of the calcined shaped particle is contained in the pores having a pore diameter greater than 350 Å, and, most preferably, less than 5%.

The references herein to the pore size distribution and pore volume of the calcined shaped particle are to those properties as determined by mercury intrusion porosimetry, ASTM test method D 4284. The measurement of the pore size distribution of the calcined shaped particle is by any suitable measurement instrument using a contact angle of 140° with a mercury surface tension of 474 dyne/cm at 25° C.

One aspect of the inventive method is the use of at least two separate impregnation steps to incorporate one or more of the active metal components, and, optionally, but preferably, a promoter into the shaped particle or support particle. The use of at least two separate metal impregnation steps allows for the inclusion of both Type I active catalyst sites and Type II active catalyst sites within the catalyst composition and for the tailoring of the relative ratio within the catalyst composition of the invention of the two types of active sites.

A Type I active catalyst site, as the term is used in this specification, is one which results from the calcination of a support material that is impregnated with an active metal or metal precursor. Thus, to form Type I active sites within a catalyst composition, a support material is impregnated with a first solution of either one or more first Group VIII metal components or one or more first Group VI metal components, or a combination of both a first Group VIII metal component and a first Group VI metal component, and, optionally, a first phosphorous component to provide a metals impregnated support. The metals impregnated support is then calcined under suitable standard calcination conditions to provide a base catalyst.

Generally, the calcination of the metals impregnated support is carried out in the presence of any suitable atmosphere and at any suitable calcination temperature condition for a sufficient time so as to provide for the desired Type I active sites. Typically, the atmosphere is an oxygen-containing gas, such as air, and the calcination temperature exceeds a drying temperature that is used for removing free water from the impregnated support. More specifically, the calcination temperature is in the range of from 350° C. to 900° C. Preferably, the calcination temperature is in the range of from 375° C. to 850° C., and, more preferably, from 400° C. to 800° C. It is most preferred for the calcination temperature to exceed 425° C. and to be less than 800° C.

The drying and calcination of the metals impregnated support results in removing free water and other volatile components therefrom and converting the metal components to their respective metal oxide. The metal components in the base catalyst that have been subjected to a calcination step or treatment are considered herein to be Type I active sites.

A Type II active catalyst site, as the term is used in this specification, is one which results from the impregnation of a support material with an active metal or metal precursor followed by drying of the impregnated support material to remove at least a portion of the free water or volatile content thereon but at a drying temperature that is less than a calcination temperature. The temperature at which the impregnated support material is dried must be less than a calcination temperature and does not exceed a drying temperature to provide for a dried intermediate. Thus, in order to form the Type II active sites using the inventive method in the preparation of the inventive catalyst composition, the base catalyst is impregnated with a second solution of either one or more second Group VIII metal components or one or more second Group VI metal components, or a combination of both a second Group VIII metal component and a second Group VI metal component, and, optionally, a second phosphorous component to thereby provide a metals impregnated base catalyst which is then dried under non-calcination conditions that are controlled so as to provide a dried intermediate.

Further, in the preparation of the catalyst composition, the metals impregnated base catalyst is dried under controlled drying temperature conditions so as to remove a portion of the free water or volatiles content of the metals impregnated base catalyst but without subjecting the metals impregnated base catalyst to calcination temperature conditions. This provides a dried intermediate which may be sulfided to provide a catalyst composition.

The drying temperature of the metals impregnated support material should then be less than 350° C. in order to provide the dried intermediate. It is preferred for the drying temperature at which the metals impregnated support material is dried to be less than 300° C., and, most preferred, the drying temperature does not exceed 250° C. It is understood, however, that the drying of the metals impregnated support material is typically conducted at a drying temperature in the range of from 60° C. to 200° C. or to 150° C. It is the metal components in the dried intermediate that have not been subjected to a calcination step or treatment that are considered herein to be the Type II sites.

It is preferred to control the drying of the metals impregnated base catalyst in a manner so as to provide the resulting dried intermediate having a volatiles content that is in a particular range. The volatiles content of the dried intermediate should be controlled so that it does not exceed or is less than 20 wt. % LOI. The LOI, or loss on ignition, is defined as the percentage weight loss of the material after its exposure to air at a temperature of 482° C. for a period of two hours, which can be represented by the following formula: (sample weight before exposure less sample weight after exposure) multiplied by 100 and divided by (sample weight before exposure). It is preferred for the LOI of the dried intermediate to be in the range of from 1 wt. % to 20 wt. %, and, more preferred, from 3 wt. % to 15 wt. %.

It is theorized that there is a synergistic catalytic effect in the catalyst composition of the invention that results from the inclusion of both Type I active catalyst sites and Type II active catalyst sites in the same catalyst composition. It is generally expected that a Type II catalyst would be more active than a Type I catalyst, but it has been observed that the inventive catalyst, with its mix of Type I and Type II metal sites, exhibits a higher activity than either a catalyst having exclusively Type I active sites or a catalyst having exclusively Type II active sites. It is, therefore, desirable for the ratio of Type II to Type I active sites of the catalyst composition to be optimized so as to provide the catalyst composition having the enhanced catalyst properties. Thus, it is thought that the ratio of the weight of the second Group VIII metal plus second Group VI metal (Type II) to the weight of the first Group VIII metal plus first Group VI metal (Type I), i.e., ratio of Type II/Type I, of the inventive catalyst composition should be in the range of upwardly to about 0.3. This weight ratio is calculated assuming that the metals are each in their respective oxide forms. It is desired, however, for the ratio of Type II to Type I active sites in the catalyst composition to be in the range of from or about 0.001 to or about 0.1. Preferably, the ratio of Type II/Type I sites in the catalyst composition is in the range of from 0.005 to 0.09, and, more preferably, the ratio of Type II/Type I sites is in the range of from 0.01 to 0.08.

In another embodiment of the inventive catalyst composition the metals loaded support, having a mixture of Type I and Type II active catalyst sites in a desired ratio, is in a sulfided form. Therefore, the dried intermediate having a particular level of volatiles content and prepared by drying under non-calcination conditions of the metals impregnated base catalyst is sulfided to provide the catalyst composition in a sulfided form.

Sulfiding of the dried intermediate can be done using any conventional method known to those skilled in the art. Thus, the dried intermediate can be contacted with a sulfur-containing compound, which can be hydrogen sulfide or a compound that is decomposable into hydrogen sulfide, under the contacting conditions of the invention. Examples of such decomposable compounds include mercaptans, $CS_2$, thiophenes, dimethyl sulfide (DMS), and dimethyl disulfide (DMDS). Also, preferably, the sulfiding is accomplished by contacting the dried intermediate, under suitable sulfurization treatment conditions, with a hydrocarbon feedstock that contains a concentration of a sulfur compound. The sulfur compound of the hydrocarbon feedstock can be an organic sulfur compound, particularly, one which is typically contained in petroleum distillates or other hydrocarbon feedstocks that are processed by hydrodesulfurization methods.

Suitable sulfurization treatment conditions are those which provide for the conversion of the active metal components of the dried intermediate to their sulfided forms. Typically, and preferably, the sulfiding temperature at which the dried intermediate is contacted with the sulfur compound is in the range of from 150° C. to 450° C., preferably, from 175° C. to 425° C., and, most preferably, from 200° C. to 400° C. When using a hydrocarbon feedstock that is to be hydrotreated using the catalyst composition of the invention to sulfide the dried intermediate, the sulfurization conditions can be the same as the process conditions under which the hydrotreating is performed.

The sulfiding pressure at which the dried intermediate is sulfided generally can be in the range of from 1 bar to 70 bar, preferably, from 1.5 bar to 55 bar, and, most preferably, from 2 bar to 35 bar.

Suitable catalytically active elements or metals from Group VIII of the periodic table that may be used as the metal of the first Group VIII metal component or of the second Group VIII metal component may be selected from the group consisting of iron (Fe), cobalt (Co), nickel (Ni), palladium (Pd), and platinum (Pt). Of these, the more preferable elements are either Ni or Co. Suitable Group VI elements or metals that may be used as the metal of the first Group VI metal component or the second Group VI metal component include chromium (Cr), molybdenum (Mo), and tungsten (W). The more preferred Group VI elements or metals are Mo and W, and, most preferred Mo.

The step of impregnating the support particle with the first Group VIII metal component, the first Group VI metal component and the first phosphorous component so as to provide a metals impregnated support having the desired metals concentrations may be done in one or more impregnation steps using one or more aqueous impregnation solutions. Typically, a first aqueous solution comprising a first Group VIII metal (preferably, either Co or Ni, or both) component, a first Group VI metal (most preferably, Mo) component, and a first phosphorous component is used to incorporate the metals into the support particle by any of the known impregnation methods. A preferred method of impregnation is by incipient wetness. The concentrations of the metals, i.e. the Group VIII metal component, Group VI metal component and phosphorous component, in the first aqueous solution are selected so as to provide the desired metals contents in the metals impregnated support or base catalyst, and, ultimately, in the final sulfided catalyst composition of the invention.

The first aqueous solution for impregnation of the metals into the support particle may be any suitable solution prepared by any suitable means or method. Generally, the metal components are dissolved in water to yield the aqueous solution of metals. The concentrations of the metals to be contained in the first aqueous solution are those that are required or necessary in order to provide the desire amounts or concentrations of the first Group VIII metal component and the first Group VIB metal component as described herein. Persons of ordinary skill in the art may determine such required or necessary metals concentrations of the first aqueous solution.

Examples of Group VIII metal components for use in the preparation of the first aqueous solution may include water insoluble compounds such as the citrates, oxalates, carbonates, hydroxycarbonates, hydroxides, phosphates, phosphides, sulfides, aluminates, molybdates, tungstates, oxides, and the like, or water soluble salt compounds such as the nitrates, hydrated nitrates, chlorides, hydrated chlorides, sulfates, hydrated sulfates, formats, acetates, hypophosphite. The more preferred nickel or cobalt compounds for use in the first aqueous solution include nitrates, sulfates, acetates, chlorides, formats, and hydroxides.

The preferred Group VI metal component for use in the first aqueous solution include suitable molybdenum compounds including molybdenum trioxide and ammonium molybdate.

The preferred phosphorous compounds for use in the first aqueous solution include any of the phosphoric acids such as orthophosphoric acid, metaphosphoric acid, pyrophosphoric acid, triphosphoric acid and tetraphosphoric acid. The more preferred phosphorous compound is orthophosphoric acid ($H_3PO_4$).

The amount of metals incorporated into the support particle by the impregnation thereof with the first aqueous impregnation solution is such as to provide a metals content of the resulting metals impregnated support so that, when calcined, the resulting base catalyst contains the desired concentrations of Group VIII metal, Group VI metal and phosphorous and, therefore, the desired level of Type I active sites.

The metal content of the metals impregnated support or base catalyst may depend upon the application for which the final catalyst composition of the invention is to be used, but, generally, for hydroprocessing applications, the first Group VIII metal component, i.e., cobalt or nickel, preferably, nickel, can be present in the metals impregnated support or base catalyst in an amount in the range of from 0.05 wt. % to 12 wt. %, preferably from 0.1 wt. % to 8 wt. %, and, most preferably, from 0.15 wt. % to 6 wt. %.

The first Group VI metal component, i.e., molybdenum or tungsten, preferably, molybdenum, can be present in the metals impregnated support or base catalyst in an amount in the range of from 1 wt. % to 30 wt. %, preferably from 1 wt. % to 25 wt. %, and, most preferably, from 1 wt. % to 20 wt. %.

The first phosphorous component can be present in the metals impregnated support or base catalyst in an amount in the range up to or less than 5 wt. %. Preferably, the first phosphorous component is present in the metals impregnated support or base catalyst in an amount in the range of from or about 0.01 wt. % to or about 4 wt. %, and, more preferably, from 0.05 wt. % to 2 wt. %.

The above-referenced weight percents for the metal components are based on the dry support material or particle and the metal component as an oxide regardless of the actual form of the metal component.

The step of impregnating the base catalyst with the second Group VIII metal component, the second Group VI metal component and the second phosphorous component so as to provide a metals impregnated base having the desired metals concentrations may be done in one or more impregnation steps using one or more aqueous impregnation solutions. Typically, a second aqueous impregnation solution comprising a second Group VIII metal (preferably, either Co or Ni, or both) component, a second Group VI metal (most preferably, Mo) component, and a second phosphorous component is used to incorporate the metals into the base catalyst by any of the known impregnation methods. A preferred method of impregnation is by incipient wetness. The concentrations of the metals, i.e. the Group VIII metal component, Group VI metal component and phosphorous component, in the second aqueous solution are selected so as to provide the desired metals contents in the metals impregnated base catalyst, or the dried intermediate, or the sulfide dried intermediate, or the final catalyst composition.

The second aqueous solution for impregnation of the metals into the base catalyst may be any suitable solution prepared by any suitable means or method. Generally, the metal components are dissolved in water to yield the aqueous solution of metals. The concentrations of the metals to be contained in the second aqueous solution are those that are required or necessary in order to provide the desire amounts or concentrations of the second Group VIII metal component and the second Group VIB metal component as are described herein. Persons of ordinary skill in the art may determine such required or necessary metals concentrations of the second aqueous solution.

Examples of Group VIII metal components for use in the preparation of the second aqueous solution may include water insoluble compounds such as the citrates, oxalates, carbonates, hydroxycarbonates, hydroxides, phosphates, phosphides, sulfides, aluminates, molybdates, tungstates, oxides, and the like, or water soluble salt compounds such as the nitrates, hydrated nitrates, chlorides, hydrated chlorides, sulfates, hydrated sulfates, formats, acetates, hypophosphite. The more preferred nickel or cobalt compounds for use in the second aqueous solution include nitrates, sulfates, acetates, chlorides, formats, and hydroxides.

The preferred Group VI metal component for use in the second aqueous solution include suitable molybdenum compounds including molybdenum trioxide and ammonium molybdate.

The preferred phosphorous compounds for use in the second aqueous solution include any of the phosphoric acids such as orthophosphoric acid, metaphosphoric acid, pyrophosphoric acid, triphosphoric acid and tetraphosphoric acid. The more preferred phosphorous compound is orthophosphoric acid ($H_3PO_4$).

The metal content of the metals impregnated base catalyst, or dried intermediate, or sulfided dried intermediate, i.e., the catalyst composition, may also depend upon the application for which the final catalyst composition of the invention is used, but, generally, for hydroprocessing applications, it is such that the ratio of the weight of the second Group VIII metal plus second Group VI metal (Type II) to the weight of the first Group VIII metal plus first Group VI metal (Type I), i.e., ratio of Type II/Type I, is in the range of upwardly to about 0.3. As such, the metal that is impregnated into the base catalyst is an amount so that the second Group VIII metal component, i.e., cobalt or nickel, preferably, nickel, can be present in the metals impregnated base catalyst, or dried intermediate, or sulfided dried intermediate in an amount in the range of from 0.015 wt. % to 3.6 wt. %, preferably from 0.03 wt. % to 2.4 wt. %, and, most preferably, from 0.045 wt. % to 1.8 wt. %.

The second Group VI metal component, i.e., molybdenum or tungsten, preferably, molybdenum, can be present in the metals impregnated base catalyst, or dried intermediate, or sulfided dried intermediate in an amount in the range of from 0.2 wt. % to 10 wt. %, preferably from 0.3 wt. % to 7.5 wt. %, and, most preferably, from 0.3 wt. % to 6 wt. %.

The second phosphorous component can be present in the metals impregnated base, or dried intermediate, or sulfided dried intermediate in an amount in the range up to or less than 1.5 wt. %. Preferably, the second phosphorous component is present in the metals impregnated base catalyst, or dried intermediate, or sulfided dried intermediate in an amount less than 1.2 wt. % and more preferably in an amount of less than 0.6 wt. %. The lower end of the range of the second phosphorous component that is present in the metals impregnated base catalyst, or dried intermediate, or sulfided dried intermediate can be greater than 0.01 wt. %, and, preferably, greater than 0.05 wt. %.

The above-referenced weight percents for the metal components are based on the dry support material or particle and the metal component as an oxide regardless of the actual form of the metal component.

To provide one embodiment of the catalyst composition of the invention, the dried intermediate is treated by any suitable method known to those skilled in the art for sulfiding supported metals-containing compositions that are useful or can be converted into useful hydroprocessing catalysts. Thus, the dried intermediate is preferably sulfided using any of the means or methods and under the conditions described herein so as to provide a catalyst composition. As discussed elsewhere herein, the dried intermediate is not calcined prior to it undergoing a sulfiding treatment.

The catalyst composition of the invention may be employed as a part of any suitable reactor system that provides for contacting it or a derivative thereof with a hydrocarbon feedstock under suitable hydroprocessing conditions that may include the presence of hydrogen and an elevated total pressure and temperature. Such suitable reaction systems can include fixed catalyst bed systems, ebullating catalyst bed systems, slurried catalyst systems, and fluidized catalyst bed systems. The preferred reactor system is that which includes a fixed bed of the inventive catalyst contained within a reactor vessel equipped with a reactor feed inlet means, such as a feed nozzle, for introducing the hydrocarbon feedstock into the reactor vessel, and a reactor effluent outlet means, such as an effluent outlet nozzle, for withdrawing the reactor effluent or the treated hydrocarbon product from the reactor vessel.

The hydroprocessing process generally operates at a hydroprocessing reaction pressure in the range of from 689.5 kPa (100 psig) to 13,789 kPa (2000 psig), preferably from 1896 kPa (275 psig) to 10,342 kPa (1500 psig), and, more preferably, from 2068.5 kPa (300 psig) to 8619 kPa (1250 psig).

The hydroprocessing reaction temperature is generally in the range of from 200° C. (392° F.) to 420° C. (788° F.), preferably, from 260° C. (500° F.) to 400° C. (752° F.), and, most preferably, from 320° C. (608° F.) to 380° C. (716° F.).

The flow rate at which the hydrocarbon feedstock is charged to the reaction zone of the inventive process is generally such as to provide a liquid hourly space velocity (LHSV) in the range of from 0.01 $hr^{-1}$ to 10 $hr^{-1}$. The term "liquid hourly space velocity", as used herein, means the numerical ratio of the rate at which the hydrocarbon feedstock is charged to the reaction zone of the inventive process in volume per hour divided by the volume of catalyst contained in the reaction zone to which the hydrocarbon feedstock is charged. The preferred LHSV is in the range of from 0.05 $hr^{-1}$ to 5 $hr^{-1}$, more preferably, from 0.1 $hr^{-1}$ to 3 $hr^{-1}$. and, most preferably, from 0.2 $h^{-1}$ to 2 $hr^{-1}$.

It is preferred to charge hydrogen along with the hydrocarbon feedstock to the reaction zone of the inventive process. In this instance, the hydrogen is sometimes referred to as hydrogen treat gas. The hydrogen treat gas rate is the amount of hydrogen relative to the amount of hydrocarbon feedstock charged to the reaction zone and generally is in the range upwardly to 1781 $m^3/m^3$ (10,000 SCF/bbl). It is preferred for the treat gas rate to be in the range of from 89 $m^3/m^3$ (500 SCF/bbl) to 1781 $m^3/m^3$ (10,000 SCF/bbl), more preferably, from 178 $m^3/m^3$ (1,000 SCF/bbl) to 1602 $m^3/m^3$ (9,000 SCF/bbl), and, most preferably, from 356 $m^3/m^3$ (2,000 SCF/bbl) to 1425 $m^3/m^3$ (8,000 SCF/bbl).

The treated product yielded from the process of the invention has a low or reduced sulfur concentration or a low or reduced nitrogen concentration relative to the hydrocarbon feedstock.

The following examples are presented to further illustrate certain aspects of the invention, but they are not to be construed as limiting the scope of the invention.

EXAMPLE 1

A Type I NiMo catalyst containing 15 weight % molybdenum, 3.5 weight % nickel and 2.2 weight % phosphorus is produced as follows:

A molybdenum solution is prepared by mixing 47.7 grams ammonium dimolybdate with 24.7 grams of molybdenum trioxide, 7.8 grams of 85% monoethanolamine and 11.6 grams of 30% hydrogen peroxide solution in 55 grams of deionized water. The mixture is heated at 120° F. until the solution is clear.

A nickel-phosphorus solution is prepared by combining 12 grams or deionized water, 23.6 grams of 85% phosphoric acid and 30.6 grams of nickel nitrate. To this mixture is added 10.2 grams of nickel carbonate, stepwise, with heating at 95° F. to give a clear solution.

The final impregnation solution is prepared by adding the molybdenum solution to the nickel-phosphorus solution with stirring. This solution is then impregnated onto 200 grams of a gamma-alumina support using incipient wetness impregnation. The impregnated particles are aged in a closed container for 3 to 12 hours before drying at 125° C. in air for 3 hours followed by calcination at 900° F. in a muffle furnace under air flow.

EXAMPLE 2

A Type II NiMo catalyst of similar metal content was prepared as follows: A mixture of 76 grams molybdenum trioxide, 29.5 grams nickel carbonate, 46 grams 85% phosphoric acid and 200 grams deionized water are heated together at 200° F. with stirring until a clear solution is obtained and until the volume of the solution is that needed to impregnate 200 grams of gamma-alumina support using an incipient wetness impregnation. The impregnated particles are aged in a closed container for 3 to 12 hours before drying at 125° C. in air for 3 hours. The catalyst was then ex-situ presulfurized using the ACTICAT® process. In this process the catalyst was treated with a 10% greater than stoichiometric amount, based on the metal content of the catalyst, of powdered elemental sulphur followed by heating the sulphur incorporated catalyst in the presence of a liquid olefinic hydrocarbon.

The metal content of the catalyst on an oxide basis was 16% Mo, 3.7% Ni and 3.9% P.

EXAMPLE 3

A Type II NiMo catalyst with very high metal content was prepared as follows: A mixture of 105.4 grams molybdenum trioxide, 41.6 grams nickel carbonate, 44.4 grams 85% phosphoric acid and 200 grams deionized water are heated together at 200° F. with stirring until a clear solution is obtained and until the volume of the solution is that needed to impregnate 200 grams of gamma-alumina support using an incipient wetness impregnation. The impregnated particles are aged in a closed container for 3 to 12 hours before drying at 125° C. in air for 3 hours. The catalyst was then ex-situ presulfurized using the ACTICAT® process. In this process the catalyst was treated with a 10% greater than stoichiometric amount, based on the metal content of the catalyst, of powdered elemental sulphur followed by heating the sulphur incorporated catalyst in the presence of a liquid olefinic hydrocarbon.

The metal content of the catalyst on an oxide basis was 20% Mo, 4.7% Ni and 3.4% P.

EXAMPLE 4

A mixed Type I/Type II catalyst of the invention with very high metal content was prepared as follows:

The Type I catalyst of Example 1 was used as a support for a second impregnation of Type II metals as follows:

A mixture of 38.2 grams molybdenum trioxide, 15.4 grams nickel carbonate, 17.8 grams 85% phosphoric acid and 200 grams deionized water are heated together at 200° F. with stirring until a clear solution is obtained and until the volume of the solution is that needed to impregnate 200 grams of Example 1, Type 1 catalyst using an incipient wetness impregnation. The impregnated particles are aged in a closed container for 3 to 12 hours before drying at 125° C. in air for 3 hours. The catalyst was then ex-situ presulfurized using the ACTICAT® process. In this process the catalyst was treated with a 10% greater than stoichiometric amount, based on the metal content of the catalyst, of powdered elemental sulphur followed by heating the sulphur incorporated catalyst in the presence of a liquid olefinic hydrocarbon.

The metal content of the catalyst on an oxide basis was 22% Mo, 5.1% Ni and 3.6% P.

EXAMPLE 5

This example describes the experimental procedure used to measure the performance of the catalyst compositions prepared as described in Examples 1 through 4 in the hydrotreating of a hydrocracker feedstock.

A laboratory stainless steel isothermal tube reactor was packed with 50 cc of the relevant catalyst and 140 cc of 70 mesh silicon carbide diluent. The catalyst was sulphided using a 5% $H_2S$ in $H_2$ gas using a gas rate of 50 liters/hr. The temperature was ramped from ambient to 400° F. at 50° F./hr, held for 2 hrs, ramped to 600° F. at the same rate and held for 2 hrs and then to 700° F. at the same rate and held for 1 hour. The temperature was then lowered to 200° F. and the test feed introduced under test conditions of 1300 psig outlet pressure (100% $H_2$), 3400 standard cubic feet per barrel (SCFB) hydrogen rate and an LHSV of 1.5 $hr^{-1}$. Temperature was then ramped to 650° F. at 50° F./hr and run for 400 hours with daily product sampling followed by testing at 680° F. for 200 hours with daily product sampling.

Properties of the test feed are shown in Table 1.

TABLE 1

| Feed Type | LCO Blend |
|---|---|
| Sulphur, wt % | 0.698 |
| Nitrogen, ppm | 1750 |
| API Gravity | 19.0 |
| D-2887 Distillation | ° F. |
| IBP | 316 |
| 10% off | 453 |
| 30% off | 515 |
| 50% off | 569 |
| 70% off | 620 |
| 90% off | 680 |
| FBP | 765 |

The hydrodenitrogenation (HDN) activity of the catalysts described in Examples 1-4 are shown in FIG. 1. The HDN activity is shown on the y-axis as the temperature required in ° F. to achieve a product nitrogen level of 5 ppm. Lower temperatures are indicative of more active catalysts. The Example 1 catalyst in FIG. 1 is the base case, Type I catalyst. The Example 4 catalyst of the invention is significantly more active than the other catalysts and by as much as 25° F. over the base case catalyst. A Type II catalyst of similar metal loading to Example 1 is only 10° F. more active than the Type I version of Example 1. A Type II catalyst of similar high metal loading to the catalyst of this invention, Example 4, is only about 15° F. more active than the base case. Thus, the large activity increase of the mixed Type I/Type II catalyst of Example 4 in which 34% additional metals were impregnated onto Example 1 base case catalyst is greater than a similar high metal loaded catalyst in which 100% of the metals are Type II (Example 3) and also more active than the Type II version of the base case catalyst (Example 2).

What is claimed is:

1. A method of preparing a catalyst composition useful in the hydroprocessing of hydrocarbon feedstocks, wherein said method comprises:
    providing a support particle;
    impregnating said support particle with a first aqueous impregnation solution comprising a first Group VIII metal component, a first Group VIB metal component and a first phosphorous component to thereby provide a metals impregnated support;
    calcining said metals impregnated support to provide a base catalyst comprising Type I active sites and said first phosphorous component;
    impregnating said base catalyst with a second aqueous impregnation solution comprising a second Group VIII component, a second Group VIB component and a second phosphorous component to thereby provide a metals impregnated base catalyst;
    drying said metals impregnated base catalyst under non-calcination conditions that are controlled so as to provide a dried intermediate comprising Type II active sites and said second phosphorous component; and
    sulfiding said dried intermediate, without a prior calcination thereof, to thereby provide said catalyst composition.

2. A method as recited in claim 1, wherein the amount of first Group VIII metal component present in the metals impregnated support is in the range of from 0.05 wt. % to 12 wt. % the amount of first Group VI metal component present in the metals impregnated support is in the range of from 1 wt. % to 30 wt. %, and the amount of first phosphorous component in the metals impregnated support is in the range up to 5 wt. %, all of which are based on the dry support particle and the metal components as oxides, regardless of their actual form.

3. A method as recited in claim 2, wherein the amount of second Group VIII metal component present in the metals impregnated base catalyst is in the range of from 0.015 wt. % to 3.6 wt. % the amount of second Group VI metal component present in the metals impregnated base catalyst is in the range of from 0.2 wt. % to 10 wt. %, and the amount of second phosphorus component in the metals impregnated base catalyst is in the range up to 1.5 wt. %, all of which are based on the dry support particle and the metal components as oxides, regardless of their actual form.

4. A method as recited in claim 3, wherein the calcining step comprises contacting said metals impregnated support with an atmosphere of an oxygen-containing gas at a calcination temperature in the range of from 350° C. to 900° C.

5. A method as recited in claim 4, wherein the sulfiding step comprises contacting said dried intermediate with a sulfur-containing compound at a sulfiding temperature in the range of from 150° C. to 450° C. and at a sulfiding pressure in the range of from 1 bar to 70 bar.

6. A method as recited in claim 5, wherein said catalyst composition has a weight ratio of said Type II active site to said Type I active sites in the range of upwardly about 0.3.

7. A method as recited in claim 6, wherein said drying of said metals impregnated base catalyst is conducted at a drying temperature that is less than 350° C.

8. A method as recited in claim 7, wherein said drying of said metals impregnated base catalyst is conducted under non-calcination conditions that are controlled so as to provide said dried intermediate having a volatiles content in the range of from 1 to 20 wt. % LOI.

9. A method as recited in claim 8, wherein the amount of first Group VIII metal component present in the metals impregnated support is in the range of from 0.1 wt. % to 8 wt. % the amount of first Group VI metal component present in the metals impregnated support is in the range of from 1 wt. % to 25 wt. %, and the amount of first phosphorus component in the metals impregnated support is in the range of from 0.01 wt. % to 4 wt. %, all of which are based on the dry support particle and the metal components as oxides, regardless of their actual form; wherein the amount of second Group VIII metal component present in the metals impregnated base catalyst is in the range of from 0.03 wt. % to 2.4 wt. % the amount of second Group VI metal component present in the metals impregnated base catalyst is in the range of from 0.3 wt. % to 7.5 wt. %, and the amount of second phosphorus component in the metals impregnated base catalyst is in the range of less than 1.2 wt. %, all of which are based on the dry support particle and the metal components as oxides, regardless of their actual form; wherein said calcining step comprises contacting said metals impregnated support with an atmosphere of an oxygen-containing gas at a calcination temperature in the range of from 350° C. to 900° C.; wherein said sulfiding step comprises contacting said dried intermediate with a sulfur-containing compound at a sulfiding temperature in the range of from 150° C. to 450° C. and at a sulfiding pressure in the range of from 1 bar to 70 bar; wherein said catalyst composition has a weight ratio of said Type II active site to said Type I active sites in the range of upwardly about 0.3; wherein said drying of said metals impregnated base catalyst is conducted at a drying temperature that is less than 350° C.; and wherein said drying of said metals impregnated base catalyst is conducted under non-calcination conditions that are controlled so as to provide said dried intermediate having a volatiles content in the range of from 1 to 20 wt. % LOI.

10. A method of preparing a catalyst composition useful in the hydroprocessing of hydrocarbon feedstocks, wherein said method comprises:
    providing a support particle;
    impregnating said support particle with a first aqueous impregnation solution comprising a first Group VIII metal component, a first Group VIB metal component and a first phosphorous component to thereby provide a metals impregnated support;
    calcining said metals impregnated support to provide a base catalyst comprising said first Group VIII metal at a concentration in the range of from 0.05 wt. % to 12 wt. %, said first Group VIB metal at a concentration in the range of from 1 wt. % to 30 wt. %, and said first phosphorous component at a concentration in the range up to 5 wt. %;
    impregnating said base catalyst with a second aqueous impregnation solution comprising a second Group VIII component, a second Group VIB component and a second phosphorous component to thereby provide a metals impregnated base catalyst;

drying said metals impregnated base catalyst under non-calcination conditions that are controlled so as to provide a dried intermediate having a volatiles content in the range of from 1 to 20 wt. % LOI; and sulfiding said dried intermediate, without a prior calcination thereof, to thereby provide said catalyst composition.

11. A method as recited in claim 10, wherein the amount of second Group VIII metal component present in the metals impregnated base catalyst is in the range of from 0.015 wt. % to 3.6 wt. % the amount of second Group VI metal component present in the metals impregnated base catalyst is in the range of from 0.2 wt. % to 10 wt. %, and the amount of second phosphorus component in the metals impregnated base catalyst is in the range up to 1.5 wt. %, all of which are based on the dry support particle and the metal components as oxides, regardless of their actual form.

12. A method as recited in claim 11, wherein the calcining step comprises contacting said metals impregnated support with an atmosphere of an oxygen-containing gas at a calcination temperature in the range of from 350° C. to 900° C.

13. A method as recited in claim 12, wherein the sulfiding step comprises contacting said dried intermediate with a sulfur-containing compound at a sulfiding temperature in the range of from 150° C. to 450° C. and at a sulfiding pressure in the range of from 1 bar to 70 bar.

14. A method as recited in claim 13, wherein said catalyst composition has a weight ratio of said Type II active site to said Type I active sites in the range of upwardly about 0.3.

15. A method as recited in claim 14, wherein said drying of said metals impregnated base catalyst is conducted at a drying temperature that is less than 350° C.

16. A method as recited in claim 15, wherein said drying of said metals impregnated base catalyst is conducted under non-calcination conditions that are controlled so as to provide said dried intermediate having a volatiles content in the range of from 3 to 15 wt. % LOI.

17. A method as recited in claim 16, wherein the amount of first Group VIII metal component present in the metals impregnated support is in the range of from 0.1 wt. % to 8 wt. % the amount of first Group VI metal component present in the metals impregnated support is in the range of from 1 wt. % to 25 wt. %, and the amount of first phosphorus component in the metals impregnated support is in the range of from 0.01 wt. % to 4 wt. %, all of which are based on the dry support particle and the metal components as oxides, regardless of their actual form; wherein the amount of second Group VIII metal component present in the metals impregnated base catalyst is in the range of from 0.03 wt. % to 2.4 wt. % the amount of second Group VI metal component present in the metals impregnated base catalyst is in the range of from 0.3 wt. % to 7.5 wt. %, and the amount of second phosphorus component in the metals impregnated base catalyst is in the range of less than 1.2 wt. %, all of which are based on the dry support particle and the metal components as oxides, regardless of their actual form; wherein said calcining step comprises contacting said metals impregnated support with said atmosphere of said oxygen-containing gas at said calcination temperature in the range of from 350° C. to 900° C.; wherein said sulfiding step comprises contacting said dried intermediate with said sulfur-containing compound at said sulfiding temperature in the range of from 150° C. to 450° C. and at said sulfiding pressure in the range of from 1 bar to 70 bar; wherein said catalyst composition has said weight ratio of said Type II active site to said Type I active sites in the range of upwardly about 0.3; wherein said drying of said metals impregnated base catalyst is conducted at said drying temperature that is less than 350° C.; and wherein said drying of said metals impregnated base catalyst is conducted under non-calcination conditions that are controlled so as to provide said dried intermediate having said volatiles content in the range of from 1 to 20 wt. % LOI.

18. A catalyst composition useful in the hydroprocessing of hydrocarbon feedstocks, wherein said catalyst composition comprises: a metals impregnated support comprising a support particle having incorporated therein a first Group VIII metal, a first Group VIB metal and a first phosphorous component and having been calcined, and, which thereafter has been impregnated with a second aqueous solution of a second Group VIII component, a second Group VIB component and a second phosphorous component and dried, but not calcined, to thereby provide a dried intermediate having a volatiles content in the range of from 1 to 20 wt. % LOI.

19. A catalyst composition as recited in claim 18, wherein said dried intermediate is sulfided.

20. A catalyst composition as recited in claim 19, wherein the amount of first Group VIII metal component present in the metals impregnated support is in the range of from 0.05 wt. % to 12 wt. % the amount of first Group VI metal component present in the metals impregnated support is in the range of from 1 wt. % to 30 wt. %, and the amount of first phosphorus component in the metals impregnated support is in the range up to 5 wt. %, all of which are based on the dry support particle and the metal components as oxides, regardless of their actual form.

21. A catalyst composition as recited in claim 20, wherein the amount of second Group VIII metal component present in the metals impregnated base catalyst is in the range of from 0.015 wt. % to 3.6 wt. % the amount of second Group VI metal component present in the metals impregnated base catalyst is in the range of from 0.2 wt. % to 10 wt. %, and the amount of second phosphorus component in the metals impregnated base catalyst is in the range up to 1.5 wt. %, all of which are based on the dry support particle and the metal components as oxides, regardless of their actual form.

22. A catalyst composition as recited in claim 21, wherein the calcinations of said metals impregnated support comprises contacting said metals impregnated support with an atmosphere of an oxygen-containing gas at a calcination temperature in the range of from 350° C. to 900° C.

23. A catalyst composition as recited in claim 22, wherein the sulfiding of said dried intermediate comprises contacting said dried intermediate with a sulfur-containing compound at a sulfiding temperature in the range of from 150° C. to 450° C. and at a sulfiding pressure in the range of from 1 bar to 70 bar.

24. A catalyst composition as recited in claim 23, wherein said catalyst composition has a weight ratio of said Type II active site to said Type I active sites in the range of upwardly about 0.3.

25. A catalyst composition as recited in claim 24, wherein said drying of said metals impregnated base catalyst is conducted at a drying temperature that is less than 350° C.

26. A catalyst composition as recited in claim 25, wherein said volatiles content is in the range of from 1 to 20 wt. % LOI.

27. A catalyst composition as recited in claim 26, wherein the amount of first Group VIII metal component present in the metals impregnated support is in the range of from 0.1 wt. % to 8 wt. % the amount of first Group VI metal component present in the metals impregnated support is in the range of from 1 wt. % to 25 wt. %, and the amount of first phosphorus component in the metals impregnated support is in the range of from 0.01 wt. % to 4 wt. %, all of which are based on the dry support particle and the metal components as oxides, regardless of their actual form; wherein the amount of second Group VIII metal component present in the metals impregnated base catalyst is in the range of from 0.03 wt. % to 2.4 wt. % the amount of second Group VI metal component present in the metals impregnated base catalyst is in the range of from 0.3 wt. % to 7.5 wt. %, and the amount of second phosphorus component in the metals impregnated base catalyst is in the range of less than 1.2 wt. %, all of which are based on the dry support particle and the metal components as oxides, regardless of their actual form; wherein said calcination temperature is in the range of from 350° C. to 900° C.; wherein said sulfiding temperature is in the range of from 150° C. to 450° C.; wherein said catalyst composition has a weight ratio of said Type II active site to said Type I active sites in the range of upwardly about 0.3; and wherein said drying temperature is less than 350° C.

28. A composition comprising: a support having incorporated therein Type I active sites and Type II active sites present in said composition at a weight ratio of Type II to Type I active sites in the range of upwardly to about 0.3.

* * * * *